July 22, 1969   M. A. McKINLEY   3,457,560
UNDERVOLTAGE AND OVERVOLTAGE ALARM CIRCUIT
Filed Sept. 24, 1965
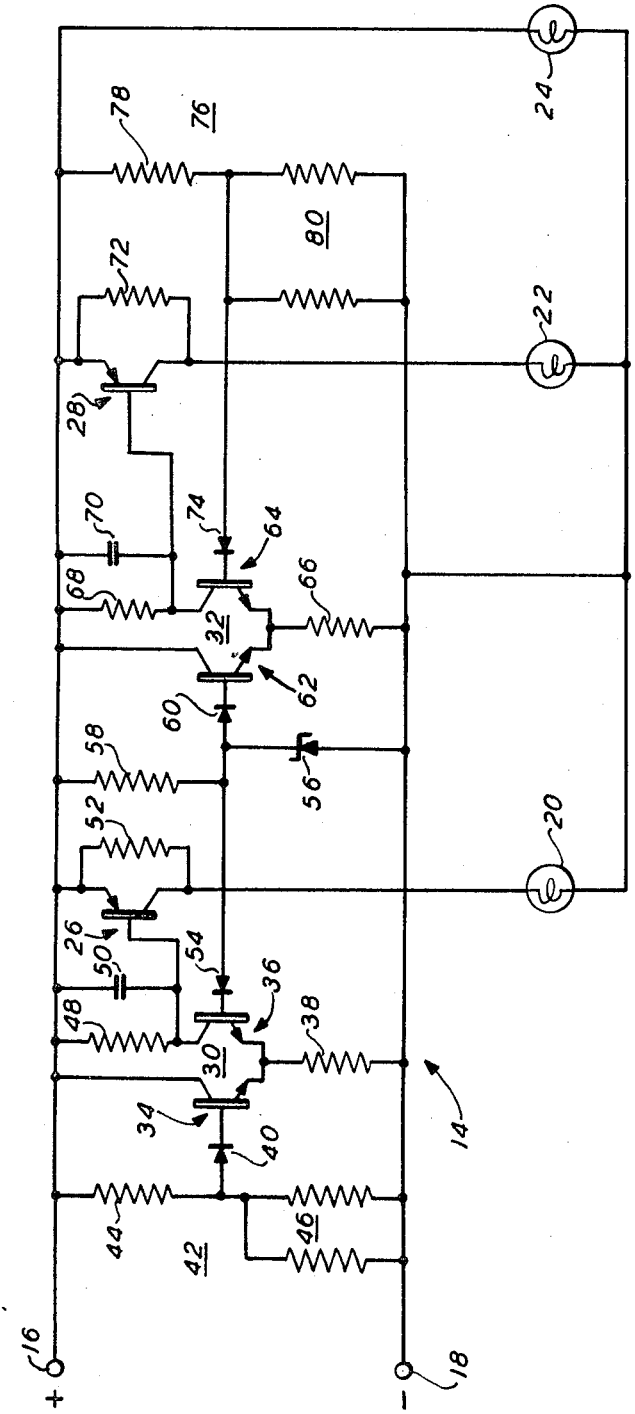
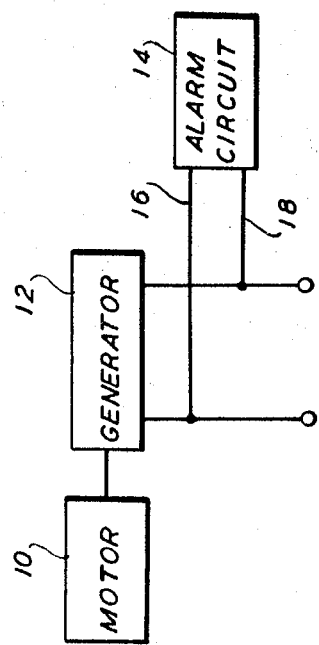
INVENTOR.
MILTON A. McKINLEY
BY Lawrence J. Lerner
ATTORNEY

United States Patent Office 3,457,560
Patented July 22, 1969

3,457,560
UNDERVOLTAGE AND OVERVOLTAGE ALARM
CIRCUIT
Milton Arthur McKinley, 24 E. Columbia Ave.,
Palisades Park, N.J. 07650
Filed Sept. 24, 1965, Ser. No. 489,865
Int. Cl. G08b 21/00
U.S. Cl. 340—248         13 Claims

ABSTRACT OF THE DISCLOSURE

An undervoltage and overvoltage alarm circuit is disclosed which includes a first signaling means to provide an indication when the monitored potential falls below a first predetermined magnitude, and a second different signaling means for providing an indication of the fact that the monitored potential exceeds a second predetermined magnitude. The first undervoltage signal means and the second overvoltage signaling means are operated in response to the activation of individual sensing circuits which continually compare the monitored potential with a single reference potential. When the monitored potential exceeds or falls below the predetermined values, the sensing circuits are activated to energize the individual signaling means.

---

In general, this invention relates to a new and improved undervoltage and overvoltage alarm circuit and more particularly to an undervoltage and overvoltage alarm circuit which is especially useful on aircraft.

In the past, aircraft have utilized voltmeters to determine the output voltage of the generators and to thus determine whether the electrical system on the aircraft was operating normally. Since the aircraft often was under extreme temperature variations, the operable range of voltages varied and it would be necessary for the pilot to determine whether the particular operating range was acceptable for the conditions under which he was flying. Further, because the pilot normally was not a trained electrical technician, he often did not fully understand the significance of particular readings of the voltmeters. Still further, the voltmeter itself was one of literally hundreds of dials in a modern cockpit and, therefore, it was often overlooked, or extended periods of time elapsed before the pilot would notice that his electrical system was not operating normally.

In fact, in recent years, there have been an increasing number of accidents with aircraft, especially small private aircrafts, (usually flown by novice pilots) where a failure in the electrical system has been determined as the cause of the accident.

Therefore, it is the general object of this invention to avoid and overcome the foregoing and other difficulties of the prior art practices by the provision of a new and better voltage alarm system.

Another object of this invention is the provision of a new and better voltage alarm system for aircraft capable of giving alarm indications for both undervoltage and overvoltage conditions.

Still another object of this invention is the provision of a new and better voltage alarm circuit for aircraft which is sensitive to temperature conditions.

A further object of this invention is the provision of a new and better voltage alarm circuit for aircraft which will give a visual indication of overvoltage and undervoltage conditions as well as a complete failure of the alarm circuit per se.

A still further object of this invention is the provision of a new and more efficient voltage alarm circuit which is inexpensive to manufacture and simple to maintain and install and utilizes a minimum of power during normal operation.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a schematic showing of the utilization of the alarm circuit of the present invention with a motor generator set.

FIGURE 2 is a circuit diagram showing a preferred embodiment of the alarm circuit of the present invention.

In FIGURE 1, there is generally shown the system incorporating the principles of the present invention. That is, there is shown a motor 10 operative to drive a generator 12 supplying a desired output voltage, which output voltage may be regulated by suitable circuitry (not shown). The motor 10 is, in the preferred embodiment, an aircraft engine and the generator 12 is operative to supply a direct current voltage. In the alternative, the generator 12 could be an alternator with a rectifier circuit interposed between the generator 12 and an alarm circuit 14 built in accordance with the principles of the present invention.

The alarm circuit 14 is best shown in FIGURE 2. The circuit 14 includes two input terminals 16 and 18 which receive a DC voltage therebetween. The alarm circuit 14 includes an undervoltage indicating lamp 20, an overvoltage indicating lamp 22, and a circuit operative lamp 24. Undervoltage lamp 20 is controlled by switching transistor 26 and overvoltage lamp 22 is controlled by switching transistor 28. The switching transistor 26 is controlled by an undervoltage current steering circuit 30, and switching transistor 28 is controlled by an overvoltage current steering circuit 32.

Undervoltage current steering circuit 30 includes a first transistor 34 and a second transistor 36 each of the NPN type with their emitters commonly connected through an emitter resistor 38 to the negative terminal 18 of the circuit 14. The collector of first transistor 34 is connected to the positive terminal 16 of alarm circuit 14. The base of first transistor 34 is connected through a protective diode 40 to the midpoint of a voltage divider circuit 42, which voltage divider circuit includes a first resistor 44 connected between the diode 40 and positive terminal 16 and a second parallel resistor circuit 46 connected between the diode 40 and the negative terminal 18. The collector of second transistor 36 is connected to the base of switching transistor 26 and, additionally, the collector is also connected to the positive terminal 16 through a parallel resistor 48, capacitor 50 circuit. Switching transistor 26 has a bypass resistor 52 connected between the emitter and collector thereof to allow a minimum current to the continuously supplied to the undervoltage lamp 20. Resistor 52 is of a sufficiently high value so as to limit the current through lamp 20 to an amount less than that necessary to illuminate the same. However, it does maintain the lamp 20 in a ready state so that when switching transistor 26 conducts, in the manner to be discussed below, the lamp 20 will immediately be illuminated. Further, the resistor 52 limits surges on the lamp 20 and otherwise extends the life thereof.

The base of transistor 36 is connected through a protective diode 54 to one terminal of a Zener diode 56 whose other terminal is connected to the negative terminal 18. The one terminal of Zener diode 46 is also connected through a high resistance resistor 58 to the positive terminal 16. Still further, the one terminal of Zener diode 56 is connected through a protective diode 60 to the base of a third transistor 62 forming a part of the overvoltage current steering circuit 32. The overvoltage circuit 32 also includes a fourth transistor 64. The third transistor 62 and fourth transistor 64 have their emitters connected through a common emitter resistor 66 to the negative terminal 18.

The collector of third transistor 62 is connected to the positive terminal 16. The collector of fourth transistor 64 is directly connected to the base of switching transistor 28. Further, the collector of transistor 64 is connected through a resistor 68, capacitor 70 circuit to the positive terminal 16. The switching transistor 28 has its emitter connected to the positive terminal 16 and its collector connected to the lamp 22. The switching transistor 28 has a high resistance resistor 72 connected between the emiter and collector thereof for the same purposes as resistor 52 discussed previously. The base of fourth transistor 64 is connected through a protective diode 74 to a midpoint of a second voltage dividing circuit 76. Second voltage dividing circuit 76 includes a resistor 78 connected between diode 74 and the positive terminal 16 and a parallel resistive network 80 connected between the diodes 74 and the negative terminal 18.

The Zener diode 56 is chosen with a value slightly less than the desired low voltage limit. Thus, when the voltage is supplied across terminals 16 and 18, initially lamp 24 lights to show that the circuit is operative and, further, if the voltage across terminals 16 and 18 is above the low voltage limit, Zener diode 56 will breakdown maintaining the Zener voltage on the base terminals of transistors 36 and 62.

Undervoltage current steering circuit 30 will operate in the following manner:

The voltage divider network 42 is designed in a manner whereby when the voltage across terminals 16 and 18 is larger than the desired undervoltage value, there will be a voltage across resistor network 46 greater than the Zener voltage. Accordingly, the transistor 34 will be conductive whereas transistor 36 will not conduct.

Since transistor 36 is not conducting, the collector of transistor 36 will not draw current from the base of transistor 26 and transistor 26 will remain cut off and lamp 20 will not be illuminated. Should the voltage across input terminals 16 and 18 drop below the predetermined voltage, then the voltage across resistive network 46 will proportionately be reduced to an amount less than the Zener voltage and, accordingly, transistor 34 will be cut off and transistor 36 will conduct. When transistor 36 conducts, its collector current will be drawn through the base of switching transistor 26 which will then be conductive. When transistor 26 conducts, the circuit is completed to a positive terminal 16 through the collector-emitter circuit of transistor 26, to lamp 20 and, thence, to the negative terminal 18 bringing the lamp 20 to full illumination. This indicates to the pilot that an undervoltage condition exists. It will be noted that the capacitor 50 is placed in the collector circuit of transistor 36 to prevent oscillation thereof. It will be further noted that even if the supply voltage across terminals 16 and 18 drops below the Zener diode 56 breakdown voltage, the Zener resistance is such that the voltage divider network 42 will always supply a smaller voltage to the base transistor 34 than will be supplied by the now voltage divider network including resistor 58 and Zener diode 56 to the base of transistor 36.

Where high voltage is to be monitored, the diodes 40 and 54 will prevent injury to the transistors 34 and 36 which might occur due to large reverse voltages across the base emitter junctions of transistors 34 and 36.

The overvoltage current steering circuit 32 is also operative through the Zener diode 56. That is, Zener diode 56 maintains a given Zener voltage on the base of transistor 62. The base of transistor 64 is connected to the voltage divider network 76. The voltage divider network 76 is designed in a manner whereby with any voltage below the desired high voltage limit, the voltage across resistor network 80 will be less than the Zener voltage being applied to the base of transistor 62. Under these conditions, transistor 28 will remain cut off and overvoltage lamp 22 will not be illuminated. However, should the voltage across terminals 16 and 18 exceed a given limit, the voltage across resistive network 80 will then be greater than the Zener voltage and, accordingly, transistor 64 will conduct and transistor 62 will be cut off, supplying current through the collector circuit of transistor 64 to the base of switching transistor 28 making that transistor conduct. When this occurs, current will flow through the transistor 28 and cause the lamp 22 to be illuminated.

It should be noted that the reference for both undervoltage and overvoltage conditions has been achieved through the use of a single reference source, i.e., Zener diode 56.

Zener diode 56, should have a negative temperature coefficient so that as its temperature decreases, its breakdown voltage will increase. This is necessary as under cold conditions, most of the electrical equipment on the aircraft normally has a higher minimum voltage requirement. Accordingly, there is an automatic compensation of the undervoltage unit of the alarm circuit 14 in accordance with temperature conditions.

Since, in normal operation, transistors 34 and 62 are conducting, it is desirable to minimize the power consumed by the alarm circuit 14 during this normal operation. Accordingly, since the power consumed is dependent upon the current through transistors 34 and 62 and emitter to collector voltage across then, Zener diode 56 is selected for as high a voltage as practical while still meeting its other requirements. In this way, the collector-emitter voltage drop is maintained at a minimum for transistors 34 and 62 and, since the emitter resistors 38 and 66 respectively will maintain the current in milliamperes, the total power consumption of the alarm circuit during normal operation can be measured in milliwatts. Thus, there is little power consumption, the transistors 34 and 62 will not overheat, and costly heat sinks are not necessary.

Still further, it should be noted that there is continuous monitoring of the operation of the alarm system 14 by reason of the lamp 24 which is directly connected across the terminals 16 and 18.

I claim as my invention:

1. An undervoltage and overvoltage alarm circuit for the use with an electric generator of an aircraft comprising an undervoltage reference source for providing a reference potential, first signal means for providing a first signal when an undervoltage is sensed, an undervoltage sensing means operative to compare said reference potential to the potential from said electric generator to energize said first signal means when said electric generator potential exceeds a predetermined value, an overvoltage reference source for providing a reference potential, second signal means for providing a second different signal when an overvoltage is sensed, an overvoltage sensing means operative to compare said reference potential to the potential from said electric generator and to energize said overvoltage second signal means when said electric generator potential exceeds a second predetermined value, said second predetermined value being greater than said first mentioned predetermined value, said undervoltage reference source and said overvoltage reference source being a single reference source.

2. The undervoltage and overvoltage alarm circuit for use with the electric generator of an aircraft of claim 1 wherein said undervoltage reference source and said overvoltage reference source both vary with respect to temperature to raise said first mentioned predetermined value and said second predetermined value with decreases in temperature and vice versa.

3. The undervoltage or overvoltage alarm circuit for use with the electric generator of an aircraft of claim 1 wherein said first signal means and said second signal means are electric lamps, said undervoltage sensing means and said overvoltage sensing means being each respectively operative to provide a minimum signal to their associated electric lamps, the said minimum signal being below the illumination point of said electric lamps so as to prevent current surges to said electric lamps and to shorten the time necessary for illuminating said electric lamps when one of said undervoltage sensing means and overvoltage sensing means is operative to energize its respective electric lamp and thus illuminate the same.

4. An undervoltage and overvoltage alarm circuit for monitoring an input signal comprising input terminals, an undervoltage current steering circuit connected across said input terminals, an overvoltage current steering circuit connected across said input terminals, an undervoltage reference source for providing a reference potential, said undervoltage current steering circuit being operative to compare said reference potential to the potential across said input terminals and to provide an output signal to a first signal means when said input terminal potential exceeds a first predetermined value, an overvoltage reference source, said overvoltage current steering circuit being operative to compare said overvoltage reference potential to the input terminal potential to energize a second, different signal means when said input terminal potential exceeds a second predetermined value, said undervoltage reference source and said overvoltage reference source being a single reference source.

5. The alarm circuit of claim 4 wherein each of said current steering circuits include two transistors, the base of one of said transistors of said undervoltage current steering circuit being directly responsive to said input terminal potential, the base of the other transistor of said undervoltage current steering circuit being responsive to said single reference source, said undervoltage sensing means being operative when said other transistor of said undervoltage current steering circuit is conducting and said first signal means being de-eneregized when said other transistor of said undervoltage current steering circuit is cut off.

6. The alarm circuit of claim 5 wherein the base of one transistor of said overvoltage current steering circuit is responsive to said single reference source, the other transistor of said overvoltage current steering circuit being responsive to said input terminal potential, said overvoltage sensing means being energized when said other transistor of said overvoltage current steering circuit is conducting, said second signal means being de-energized when said other transistor of said overvoltage current steering circuit is cut off.

7. The alarm circuit of claim 6 wherein said single reference source is a Zener diode connected between the bases of said other transistor of said undervoltage current steering circuit and said one transistor of said overvoltage current steering circuit and one of said input terminals.

8. The alarm circuit of claim 7 wherein said Zener diode has a negative coefficient of resistance with respect to temperature.

9. The alarm circuit of claim 6 including oneway current conducting means operative to conduct current in only one direction connected to the bases of each of said transistors to prevent reverse current breakdown of said transistors under high voltage conditions.

10. The alarm circuit of claim 6 wherein the collectors of said one transistors are each directly connected to one of said input terminals whereby when said one transistors are conducting, the base-collector voltage of said one transistors is maintained at a minimum to minimize power loss when said first signal means and said second signal means are de-energized.

11. The alarm circuit of claim 6 including an undervoltage switching transistor connected between the collector of said other transistor of said undervoltage current steering circuit and said first signal means, said undervoltage switching transistor being operative to conduct current from said input terminals to said first signal means when said other transistor of said undervoltage current steering circuit is conducting, and an overvoltage switching transistor connected between the collector of said other transistor of said overvoltage current steering circuit and said second signal means, said overvoltage switching transistor being operative to connect said second signal means across said input terminals when said other transistor of said overvoltage current steering circuit is conducting.

12. The alarm circuit of claim 11 wherein said switching transistors each have high resistance resistor bypasses connecting their respective signal means to said input terminals through said high resistance resistors, each of said first and second signal means including an electric lamp, said high resistance resistors limiting the current flow through their respective signal means electric lamps to provide a current less than is necessary to cause illumination of said electric lamps.

13. The alarm circuit of claim 6 including an input terminal signal means connected across said input terminals to indicate the presences of an electric potential across said input terminals.

References Cited

UNITED STATES PATENTS

| 1,455,458 | 5/1923 | Townsend. |
| 2,450,450 | 10/1948 | Schmidinger. |
| 3,113,299 | 12/1963 | Ida _____ 340—415 |
| 3,227,895 | 1/1966 | Gray _____ 328—147 XR |
| 3,243,658 | 3/1966 | Blackburn. |
| 3,311,907 | 3/1967 | Teal. |
| 3,354,448 | 11/1967 | Brolin. |

JOHN W. CALDWELL, Primary Examiner

DANIEL K. MYER, Assistant Examiner

U.S. Cl. X.R.

307—235; 328—148